(12) United States Patent
Knoblauch

(10) Patent No.: US 11,187,265 B2
(45) Date of Patent: Nov. 30, 2021

(54) ROLLING BEARING HAVING A SENSOR AND DRIVE UNIT

(71) Applicant: Dr. Ing. h.c. F. Porsche Aktiengesellschaft, Stuttgart (DE)

(72) Inventor: Daniel Knoblauch, Leonberg (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 0 days.

(21) Appl. No.: 17/032,012

(22) Filed: Sep. 25, 2020

(65) Prior Publication Data

US 2021/0088076 A1 Mar. 25, 2021

(30) Foreign Application Priority Data

Sep. 25, 2019 (DE) .............. 10 2019 125 801.4

(51) Int. Cl.
| | | |
|---|---|---|
| *F16C 19/06* | (2006.01) | |
| *F16C 19/52* | (2006.01) | |
| *F16C 41/00* | (2006.01) | |
| *H02K 11/21* | (2016.01) | |
| *F16C 33/62* | (2006.01) | |

(52) U.S. Cl.
CPC .............. *F16C 19/06* (2013.01); *F16C 19/52* (2013.01); *F16C 33/62* (2013.01); *F16C 41/00* (2013.01); *F16C 2204/04* (2013.01); *F16C 2233/00* (2013.01); *F16C 2380/26* (2013.01); *H02K 11/21* (2016.01)

(58) Field of Classification Search
CPC ........ F16C 19/06; F16C 19/52; F16C 33/586; F16C 33/62; F16C 41/002; F16C 41/007; F16C 43/00; F16C 2204/04; F16C 2233/00; F16C 2326/01; F16C 2326/26; H02K 7/08; H02K 11/21; H02K 5/173; G01P 3/488
USPC ........................................ 384/448, 456, 490
See application file for complete search history.

(56) References Cited

U.S. PATENT DOCUMENTS

| 2015/0162798 A1* | 6/2015 | Ozawa ................... H02K 5/161 310/43 |
| 2015/0226297 A1* | 8/2015 | Knoblauch ......... F16H 37/0833 475/150 |

FOREIGN PATENT DOCUMENTS

| CN | 101427141 A | * | 5/2009 | ............ F16C 41/007 |
| CN | 107615074 A | * | 1/2018 | ................ G01P 3/42 |
| DE | 19644744 A1 | * | 5/1998 | ......... F16C 33/7879 |
| DE | 102009044542 B3 | * | 5/2011 | ............. G01P 3/443 |
| DE | 102009056355 A1 | * | 6/2011 | ............. G01P 3/487 |
| DE | 102012215957 A1 | * | 5/2014 | .............. F16C 33/80 |
| DE | 102015219167 A1 | * | 4/2017 | ............ F16C 41/007 |
| DE | 102017130644 A1 | * | 6/2019 | .............. F16C 41/00 |
| EP | 3026283 A1 | * | 6/2016 | .............. F16C 41/00 |
| WO | WO-2011134955 A2 | * | 11/2011 | .............. F16C 41/00 |
| WO | WO-2015037491 A | * | 3/2015 | ............ F16C 41/007 |

(Continued)

*Primary Examiner* — Marcus Charles
(74) *Attorney, Agent, or Firm* — Gerald E. Hespos; Michael J. Porco; Matthew T. Hespos

(57) ABSTRACT

A rolling bearing (1) has an outer ring (3) and an inner ring (2) that can rotate in relation to the outer ring (3). A sensor (8) is arranged on the outer ring (3) and a master ring (13) is arranged on the inner ring (2). The master ring (13) can be detected by the sensor (8). The master ring (13) has an electrically conductive section (15), and a contact element (10) fixed on the outer ring (3) bears against the electrically conductive section (15) of the master ring (13).

14 Claims, 2 Drawing Sheets

(56) References Cited

FOREIGN PATENT DOCUMENTS

WO     WO-2020015772 A1 *   1/2020    ............. G01P 3/443

* cited by examiner

ROLLING BEARING HAVING A SENSOR AND DRIVE UNIT

CROSS REFERENCE TO RELATED APPLICATION

This application claims priority under 35 USC 119 to German Patent Appl. No. 10 2019 125 801.4 filed on Sep. 25, 2019, the entire disclosure of which is incorporated herein by reference.

BACKGROUND

Field of the Invention

The invention relates to a rolling bearing having an outer ring and an inner ring that can rotate in relation to the outer ring. A sensor is arranged on the outer ring and a master ring arranged on the inner ring can be detected by the sensor. The invention relates to a drive unit comprising an electrical machine and the above-described rolling bearing.

Related Art

Rolling bearings having a sensor and a master ring that can be detected by the sensor are used in drive units, for example, for mounting machine shafts of electrical machines to monitor the rotational position of the machine shaft. An undesired electrical voltage across the rolling bearing and bearing currents caused by this voltage can occur in applications of this kind. Bearing currents that have a high current density can cause considerable damage to the rolling bearing. This damage can lead to premature failure of the rolling bearing and therefore of the drive unit.

An object of the invention is to extend the service life of the drive unit.

SUMMARY

The invention relates to a rolling bearing having an outer ring and an inner ring that can rotate in relation to the outer ring. A sensor is arranged on the outer ring, and a master ring arranged on the inner ring can be detected by the sensor. More particularly, the master ring has an electrically conductive section, and a contact element fixed on the outer ring bears against the electrically conductive section.

The contact element and the electrically conductive section of the master ring establish an electrical connection between the outer ring and the inner ring of the rolling bearing. This electrical connection can result in potential equalization, thereby preventing undesired electrical voltages between the inner ring and the outer ring, and reducing the risk of bearing currents with high current densities. Accordingly, damage to the bearing can be avoided, and the service life can be increased. The master ring fulfils a double function as a mating piece for both the sensor and the contact element to achieve particularly compact configuration of the rolling bearing.

The master ring may have an electrically conductive coating in the electrically conductive section. The coating provides sufficient electrical conductivity while avoiding direct contact between the contact element and a substrate of the master ring and thereby avoiding abrasion on the substrate.

The coating contains may contain silver to increased electrical conductivity.

The electrically conductive section of the master ring may be a hollow cylinder. As a result, it is possible to arrange the electrically conductive section of the master ring on an outer lateral surface of the inner ring. This measure makes it easier for the contact element to make contact with the electrically conductive section. The contact element can be arranged to run in a radial direction and can be in contact with an outer lateral surface of the electrically conductive section.

The master ring may have a measuring scale. The measuring scale can be scanned by the sensor to ascertain a rotational position of the inner ring in relation to the outer ring. The measuring scale can be a magnetic measuring scale that may comprise alternating north and south poles. As an alternative, the measuring scale can be an optical measuring scale that has adjacent regions with different optical properties, for example different reflection or absorption properties.

The measuring scale may be an annular disk-like section of the master ring that is connected to the electrically conductive section. An annular disk-like section of this kind is advantageous particularly when the master ring is detected by a sensor that is at a distance from the master ring in the axial direction of the rolling bearing. In this respect, the master ring can have an L-shaped cross section.

The contact element may be annular. The annular contact element can make contact with the electrically conductive region of the master ring over the entire periphery. Thus, an extremely low-impedance electrical connection between the inner ring and the outer ring can be achieved.

The contact element may have a flexible contact region. Thus, the contact region can deform in the event of an incorrect position of the inner ring in relation to the outer ring without the risk of damage to the contact element or the master ring.

The sensor may be annular. As an alternative, the sensor can be a ring segment, such as a half-ring or a quarter-ring.

The sensor may be a magnetic sensor, in particular a Hall sensor. A magnetic measuring scale of the master ring can be scanned by a magnetic sensor. As an alternative, the sensor can be configured as an optical sensor. A refinement of this kind is advantageous when the master ring has an optical measuring scale.

The sensor and the contact element may be connected directly to the outer ring. As an alternative, the sensor and the contact element may be connected to the outer ring by a common holder element. The use of a common holder element renders it possible, during manufacture of the rolling bearing, to initially fit a unit comprising the common holder element, the sensor, the master ring with the measuring scale and with the electrically conductive section, and also the contact element, and to then connect this unit to the outer ring.

A further subject matter of the invention is a drive unit comprising an electrical machine and an above-described rolling bearing for mounting a machine shaft of the electrical machine.

The same advantages as those which have already been described above in connection with the rolling bearing can be achieved with the drive unit.

The drive unit may have a transmission connected to the electrical machine, and the rolling bearing may be on a side of the electrical machine that faces the transmission for the purpose of mounting the machine shaft.

An alternative, the drive unit may comprise a transmission connected to the electrical machine, and the rolling bearing may be on a side of the electrical machine that is averted from the transmission for the purpose of mounting the machine shaft.

Alternatively, the drive unit may comprise a transmission connected to the electrical machine. First and second rolling bearings may be provided for mounting the machine shaft. The first rolling bearing may be on a side of the electrical machine that faces the transmission, and the second rolling bearing may be on a side of the electrical machine that is averted from the transmission.

Advantageous refinements and features described in connection with the rolling bearing can also be used in the drive unit on their own or in combination.

Further advantages and details of the invention will be explained below with reference to the exemplary embodiment which is illustrated in the drawings.

DETAILED DESCRIPTION

Figure 1:
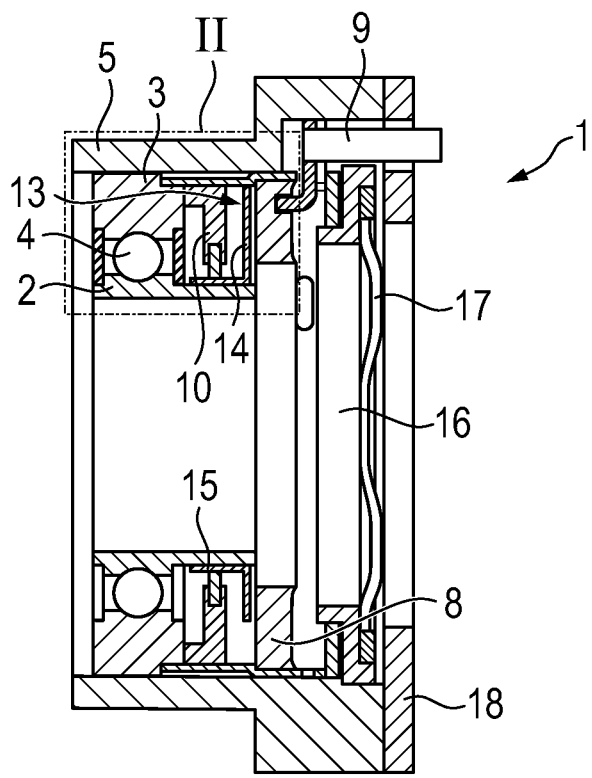
FIG. 1 is a sectional illustration of an exemplary embodiment of a rolling bearing according to the invention.
Figure 2:
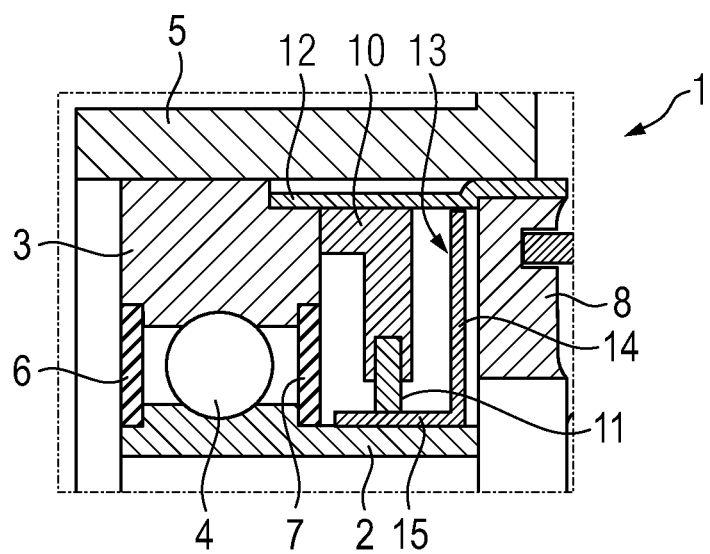
FIG. 2 is an enlarged illustration of the detail marked by reference sign II in FIG. 1.

FIG. 1 illustrates a rolling bearing 1 according to an exemplary embodiment of the invention. FIG. 2 shows an illustration of the detail marked by reference sign II. The rolling bearing 1 comprises a stationary outer ring 3 which is fastened to a housing 5 and also an inner ring 2 which can rotate in relation to the outer ring 3. The housing 5 can be formed, for example, from a metal, in particular steel. A plurality of rolling bodies 4, which are configured as balls according to the exemplary embodiment, are arranged between the outer ring 3 and the inner ring 2. As an alternative, the rolling bodies can be cylindrical, conical or barrel-like rolling bodies. The position of the rolling bodies 4 relative to one another can be defined by means of a cage. The space between the outer ring 3 and the inner ring 2 is sealed off by means of two annular sealing elements 6, 7.

The rolling bearing 1 is configured in the manner of a sensor bearing and has a sensor 8 which is connected in a manner fixed to the outer ring 3 and by means of which a master ring 13 which is arranged in a rotationally fixed manner on the inner ring 2 can be detected. Therefore, a rotational position of the inner ring 2 and/or a rotation speed of the inner ring 2 can be ascertained by means of the sensor 8. The sensor 8 is designed as an annular sensor 8 and comprises, for example, a magnetic sensor, in particular a Hall sensor. A cable bushing 9, which is arranged so as to run in a direction parallel to a rotation axis of the rolling bearing 1, is provided for making electrical contact with the sensor 8.

The rolling bearing 1 further comprises a supporting disk 16 on which a spring element 17 is supported. A bearing pretensioning force can be adjusted by means of the spring element 17. The housing 5 is covered by an annular cover 18 in the axial direction.

In the event of rotation of the inner ring 2 in relation to the outer ring 3, the stationary sensor 8 scans the master ring 13, in particular a measuring scale 14 of the master ring 13 that faces the sensor 8. The measuring scale 14 can be designed, for example, as a magnetic measuring scale. In the present exemplary embodiment, the measuring scale 14 is configured as an annular disk which is arranged in a radial plane which is perpendicular to the rotation axis of the rolling bearing 1.

The master ring 13 further comprises an electrically conductive section 15 that is connected to the measuring scale. The electrically conductive section 15 can be, for example, integrally formed with the measuring scale 14. In the exemplary embodiment, the electrically conductive section 15 is designed in the manner of a hollow cylinder which is arranged on an outer lateral surface of the inner ring 2. The electrically conductive section 15 has an electrically conductive coating which can contain, for example, silver. A contact element 10, which is arranged fixedly on the outer ring 3, bears against the electrically conductive section 15 of the master ring 13. In this way, an electrical connection is created between the outer ring 3 and the inner ring 2, the electrical connection leading to potential equalization between the two rings 3, 4.

The sensor 8 and the contact element 10 are connected to the outer ring 3 by means of a common holder element 12. The holder element 12 has a substantially hollow-cylindrical form and can be mounted onto an annular recess of the outer ring 3. According to the exemplary embodiment, the holder element 12 has a first hollow-cylindrical region, in which the contact element 10 is connected to the holder element 12, and a second hollow-cylindrical region, in which the sensor 8 is connected to the holder element 12. The first and the second hollow-cylindrical region have different diameters. In addition, the contact element 10 bears against the holder element 12 by way of an outer contour in the second hollow-cylindrical region.

The contact element 10 is annular and has an annular contact region 11 that is in contact with the master ring 13. This contact region 11 preferably is flexible and can be designed as a brush for example.

Figure 3:
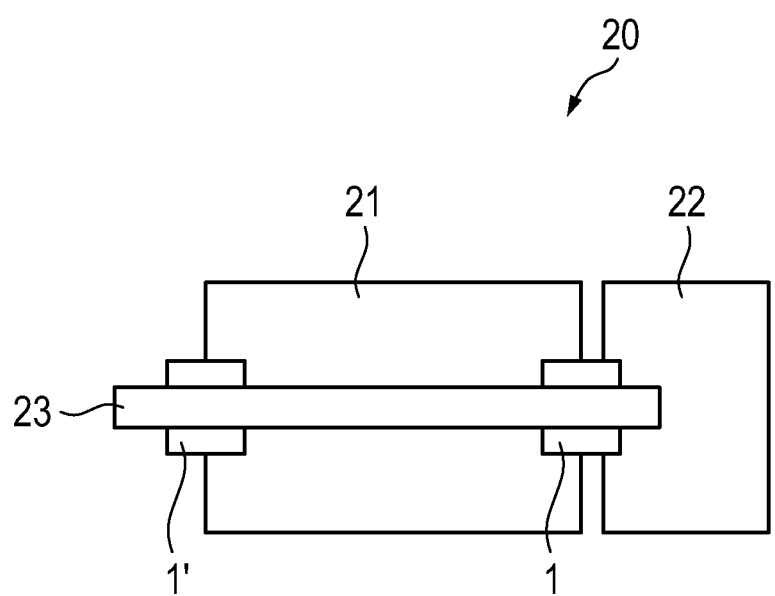
FIG. 3 is a schematic illustration of an exemplary embodiment of a drive unit according to the invention.

FIG. 3 schematically shows a drive unit 20 that can be used as a traction drive of an electric vehicle or a hybrid vehicle. The drive unit 20 comprises an electrical machine 21 with a machine shaft 23 and a transmission 22 is coupled to the machine shaft 23. A first rolling bearing 1 and a second rolling bearing 1' are provided for rotatably mounting the machine shaft 23. The first rolling bearing is on a side of the electrical machine 21 facing the transmission, and the second rolling bearing 1' is on a side of the electrical machine 21 averted from the transmission. To reduce bearing currents and resulting damage to the transmission 22, the rolling bearing 1 shown in FIGS. 1 and 2, having a contact element 10 and an electrically conductive section 15 of the master ring 13 can be used as the first rolling bearing 1. The second rolling bearing 1' also can be a rolling bearing shown in FIGS. 1 and 2.

What is claimed is:

1. A rolling bearing, comprising: an outer ring; an inner ring that can rotate in relation to the outer ring; a sensor arranged on the outer ring; and a master ring arranged on the inner ring and configured to be detected by the sensor, wherein:
    the master ring has an electrically conductive section, and
        a contact element is arranged fixedly on the outer ring, the contact element bears against the electrically conductive section of the master ring.
2. The rolling bearing of claim 1, wherein the master ring has an electrically conductive coating in the electrically conductive section.
3. The rolling bearing of claim 2, wherein the coating comprises silver.

4. The rolling bearing of claim 1, wherein the electrically conductive section of the master ring is a hollow cylinder.

5. The rolling bearing of claim 1, wherein the master ring has a measuring scale.

6. The rolling bearing of claim 5, wherein the measuring scale is an annular disk-like section of the master ring that is connected to the electrically conductive section.

7. The rolling bearing of claim 1, wherein the contact element is annular.

8. The rolling bearing of claim 1, wherein the contact element has a flexible contact region.

9. The rolling bearing of claim 1, wherein the sensor is annular.

10. The rolling bearing of claim 1, wherein the sensor is a magnetic sensor.

11. The rolling bearing of claim 1, wherein the sensor and the contact element are connected to the outer ring directly or by means of a common holder element.

12. A drive unit comprising an electrical machine and the rolling bearing of claim 1 for mounting a machine shaft of the electrical machine.

13. The drive unit of claim 12, further comprising a transmission connected to the electrical machine, wherein the rolling bearing is arranged on a side of the electrical machine that faces the transmission for purposes of mounting the machine shaft.

14. The drive unit of claim 12, further comprising a transmission connected to the electrical machine, wherein the rolling bearing is arranged on a side of the electrical machine that is averted from the transmission for purposes of mounting the machine shaft.

* * * * *